(12) United States Patent
Mendez

(10) Patent No.: US 9,807,046 B2
(45) Date of Patent: Oct. 31, 2017

(54) AUTOMATED MESSAGING SYSTEM SURVIVOR

(71) Applicant: Peter Mendez, Oxnard, CA (US)

(72) Inventor: Peter Mendez, Oxnard, CA (US)

( * ) Notice: Subject to any disclaimer, the term of this patent is extended or adjusted under 35 U.S.C. 154(b) by 222 days.

(21) Appl. No.: 14/858,092

(22) Filed: Sep. 18, 2015

(65) Prior Publication Data

US 2016/0087919 A1    Mar. 24, 2016

Related U.S. Application Data

(60) Provisional application No. 62/053,744, filed on Sep. 22, 2014.

(51) Int. Cl.
    *H04L 12/58*        (2006.01)
(52) U.S. Cl.
    CPC .............. *H04L 51/26* (2013.01); *H04L 51/14* (2013.01)
(58) Field of Classification Search
    CPC ...................................................... H04L 51/26
    USPC ........................................................ 709/206
    See application file for complete search history.

(56) References Cited

U.S. PATENT DOCUMENTS

| | | | | |
|---|---|---|---|---|
| 4,750,121 A * | 6/1988 | Halley | ............... | G06Q 40/00 |
| | | | | 705/35 |
| 7,860,805 B2 * | 12/2010 | Wood | ................. | G06Q 40/08 |
| | | | | 705/325 |
| 8,271,301 B1 * | 9/2012 | Nordyke | ............ | G06Q 40/08 |
| | | | | 705/35 |
| 8,532,343 B1 * | 9/2013 | Freedman | ......... | G06K 9/00335 |
| | | | | 382/115 |
| 8,910,055 B2 | 12/2014 | Berger | | |
| 8,930,253 B1 * | 1/2015 | Ball | ...................... | G06Q 40/00 |
| | | | | 705/35 |
| 2002/0072925 A1 * | 6/2002 | Krim | ..................... | G06Q 10/10 |
| | | | | 709/206 |
| 2003/0033172 A1 * | 2/2003 | Menke | ................. | G06Q 20/10 |
| | | | | 705/4 |
| 2004/0093231 A1 * | 5/2004 | Walz | ..................... | G06Q 10/10 |
| | | | | 705/4 |
| 2005/0034079 A1 * | 2/2005 | Gunasekar | ........... | G06F 17/289 |
| | | | | 715/753 |
| 2005/0055232 A1 * | 3/2005 | Yates | .................... | G06Q 10/10 |
| | | | | 705/1.1 |
| 2005/0267797 A1 * | 12/2005 | Takahashi | ............ | G06F 3/1222 |
| | | | | 718/102 |
| 2009/0003552 A1 * | 1/2009 | Goldman | ............. | G06Q 10/107 |
| | | | | 379/88.22 |
| 2009/0177745 A1 * | 7/2009 | Davis | ................... | G06Q 10/107 |
| | | | | 709/204 |
| 2009/0248828 A1 * | 10/2009 | Gould | ................. | G08B 27/005 |
| | | | | 709/207 |
| 2012/0047055 A1 * | 2/2012 | Aiello | ................... | G06Q 40/00 |
| | | | | 705/35 |
| 2013/0080532 A1 * | 3/2013 | Stewart | ................. | G06Q 50/01 |
| | | | | 709/204 |

(Continued)

OTHER PUBLICATIONS

Buzzfile, "Memoirs From Heaven LLC", 2017.*
Cowper et al., "A Primer and Comparative Review of Major U.S. Mortality Databases", 2002.*

*Primary Examiner* — O. C. Vostal
(74) *Attorney, Agent, or Firm* — Paul D. Chancellor; Ocean Law

(57) ABSTRACT

An automated messaging system for distributing personalized messages of a deceased user to particular recipients on particular dates.

7 Claims, 14 Drawing Sheets

(56) References Cited

U.S. PATENT DOCUMENTS

| | | | |
|---|---|---|---|
| 2013/0235218 A1* | 9/2013 | Cathcart, II | H04N 5/23203 348/207.1 |
| 2014/0114886 A1* | 4/2014 | Mays | G06Q 30/02 706/12 |
| 2014/0337059 A1* | 11/2014 | Simon | G06Q 50/186 705/4 |
| 2014/0344905 A1* | 11/2014 | Sheppard | H04L 63/10 726/5 |
| 2015/0066811 A1* | 3/2015 | Legare | G06Q 40/06 705/36 R |
| 2015/0074205 A1* | 3/2015 | Westphal | H04L 51/14 709/206 |

\* cited by examiner

| USER INFORMATION | COMMENT |
|---|---|
| 1. Name | Full legal name |
| 2. Physical address | Address where mail is received |
| 3. Email address | Best email address |
| 4. Cell phone number | |
| 5. Birth date (optionally, city and state) | |
| 6. Social Security Number | Optional |
| 7. Driver license state and number | Optional |
| 8. Passport country and number | Optional |

| LOADER APPLICATIONS | DESCRIPTION |
|---|---|
| 1. Form | Fill in the blank |
| 2. Interview/Question & Answer | Legacy server asks question and awaits answer |
| 3. Reminder | Prompts sent to user |
| 4. Searcher | Obtains missing information, verifies information |

| RECIPIENT INFORMATION | DESCRIPTION |
|---|---|
| 1. Name | Full legal name and short/nick name if any |
| 2. Email address | Best known email address |
| 3. Cell telephone number | Best known cell telephone number |
| 4. Physical address | Where U.S. Postal Service mail is delivered |

| OCCASION | DATE (xx/yy/zzzz) | MESSAGE | RECURRING (yes/no) |
|---|---|---|---|
| Personal to Recipient | | | |
| 1. Birth date | | | |
| 2. Marriage anniversary | | | |
| 3. Special occasion (e.g. sweet 16) | | | |
| 4. Special memory (e.g., the day we...) | | | |
| 5. Child born to recipient after user's death | | | |
| 6. Marriage of recipient after user's death | | | |
| 7. Other | | | |
| | | | |
| Personal to User | | | |
| 1. Birth date | | | |
| 2. Marriage anniversary | | | |
| 3. Special occasion | | | |
| 4. Date of death | | | |
| 5. X days after death | | | |
| 6. Y weeks after death | | | |
| 7. Z months after death | | | |
| 8. Other | | | |
| | | | |
| Not Personal to Recipient or User | | | |
| 1, Holidays | | | |
| 2. Lessons | | | |
| 3. Secret | | | |
| 4. Other | | | |

FIG. 5G

| TEXT | AUDIO |
|---|---|
| Sources<br>WSD input device<br>Online Services<br>  Google<br>  Facebook<br>  Twitter<br>  www.newspapers.com | Sources<br>WSD input device<br>Online services<br>  Music site (e.g. Google Play)<br>  News site (www.newspapers.com) |
| PHOTOGRAPH | VIDEO |
| Sources<br>WSD input device<br>Online Services<br>  Google<br>  Facebook<br>  www.newspapers.com<br>  Google Picasa<br>  Flickr<br>  Sony Playmemories Online | Sources<br>WSD input device<br>Online Services<br>  Google<br>  Facebook<br>  www.newspapers.com<br>  Google Picasa<br>  Flickr<br>  Sony Playmemories Online |

| Information Search By Type | Search Services & Sources |
|---|---|
| 1. Email address | - yahoo email address seerch<br>- spokeo.com<br>- linkedin.com<br>- social media sites<br>- google.com |
| 2. Cell phone number | - nationalcellulardirectory.com<br>- spokeo.com<br>- social media sites<br>- google.com |
| 3. Birth Date | - anybirthday.com<br>- social media sites<br>- google.com |
| 4. Anniversary of marriage | - publicrecordscheck.com<br>- vital-records.archives.com<br>- social media sites<br>- google |
| 5. Verification sent email was opened | - readverify.com<br>- (enable delivery receipt) |
| 6. Verification test message was opened | - (enable delivery receipt) |
| 7. Death notice | - publicrecordscheck.com<br>- vital-records.archives.com |

AUTOMATED MESSAGING SYSTEM SURVIVOR

PRIORITY AND INCORPORATION BY REFERENCE

This application claims the benefit of U.S. Prov. Pat. App. No. 62/053,744 filed on Sep. 22, 2014. This application incorporates by reference U.S. Pat. No. 8,910,055 filed Sep. 15, 2010 in its entirety and for all purposes.

BACKGROUND OF THE INVENTION

Field of Invention

The present invention relates to articles of manufacture, machines, and processes. In particular, computing machines and communications infrastructure are used to create personalized messages and to automatically distribute those messages to predetermined recipients on particular dates after the creator's death.

Discussion of the Related Art

Telephone users have long known of messaging systems that make random calls and play recorded voice messages. More recently, computer users have become familiar with "email blasts." Typically, these messaging systems convey impersonal messages such as offers to sell a good or service, requests for donations, and attempts to sway opinion as by a political candidate. Hallmarks of these automated messaging systems are i) conveyance of a message calculated to reach a living person and ii) requests that the message recipient act for the benefit of the message sender.

SUMMARY OF THE INVENTION

The present invention provides an automated messaging system for distributing a user's personalized messages to recipients, the messages being created and stored during the user's lifetime and the messages being distributed to recipients on particular dates after the person's death. Multiple messages viewed by a first generation of recipient(s) may be viewed by recipient(s) of a second generation. Message delivery may occur via any suitable means and in particular by any suitable electronic messaging means.

BRIEF DESCRIPTION OF THE DRAWINGS

The present invention is described with reference to the accompanying figures. These figures, incorporated herein and forming part of the specification, illustrate embodiments of the present invention and, together with the description, further serve to explain the principles of the invention and to enable a person skilled in the relevant art to make and use the invention.

FIG. 5C shows an enrollment chart for use with the automated messaging system of FIG. 1A.

FIG. 5D shows exemplary loader applications for soliciting legacy information for use with the automated messaging system of FIG. 1A.

FIG. 5E shows a recipient identification chart for use with the automated messaging system of FIG. 1A.

FIG. 5F shows a dates and messages chart for use with the automated messaging system of FIG. 1A.

FIG. 5G shows a message architect for use with the automated messaging system of FIG. 1A.

FIG. 5H shows internet sources and services for use with the automated messaging system of FIG. 1A.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

As used herein, coupled means directly or indirectly connected by a suitable means known to persons of ordinary skill in the art. Coupled items may include interposed features such as, for example, A is coupled to C via B. Unless otherwise stated, the type of coupling, whether it be mechanical, electrical, fluid, optical, radiation, or other, is provided by the context in which the term is used.

Figure 1A:
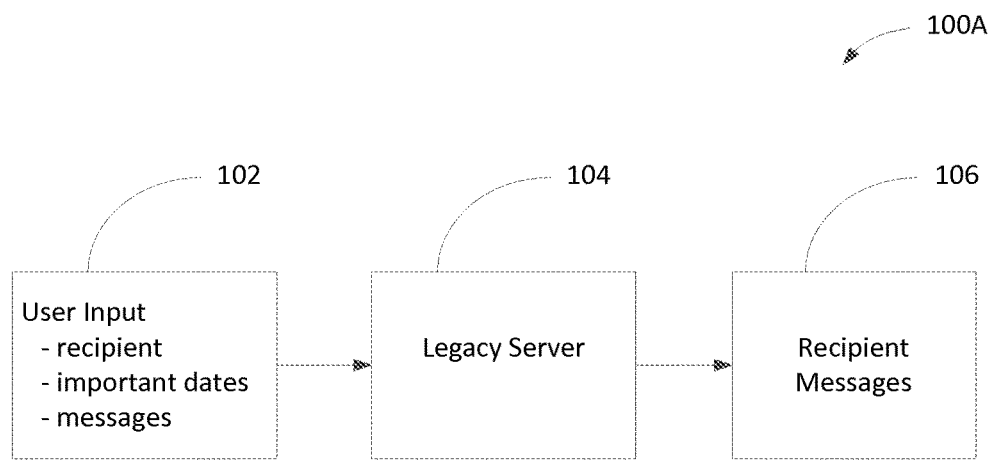
FIG. 1A is a block diagram of an embodiment of the automated messaging system of the present invention.

FIG. 1A shows a block diagram of an embodiment of the present automated messaging system survivor or automated messaging system 100A. A legacy server 104 receives and stores legacy information. As shown, the legacy server receives user input 102 and sends messages to recipients 106. The user input 102 identifies one or more recipients. For each recipient, one or more dates important to the user and/or to the recipient are associated with the recipient. For each such recipient-date, the user creates a message that is personal to the recipient and the legacy server sends that message for the benefit of the recipient following the user's death.

As used herein, legacy server refers to a computing device(s) using local or remote storage such as a cloud storage facility. As used herein, legacy information includes information about a user, information about a recipient associated with the user, and messages the user intends to send to the recipient.

Figure 1B:
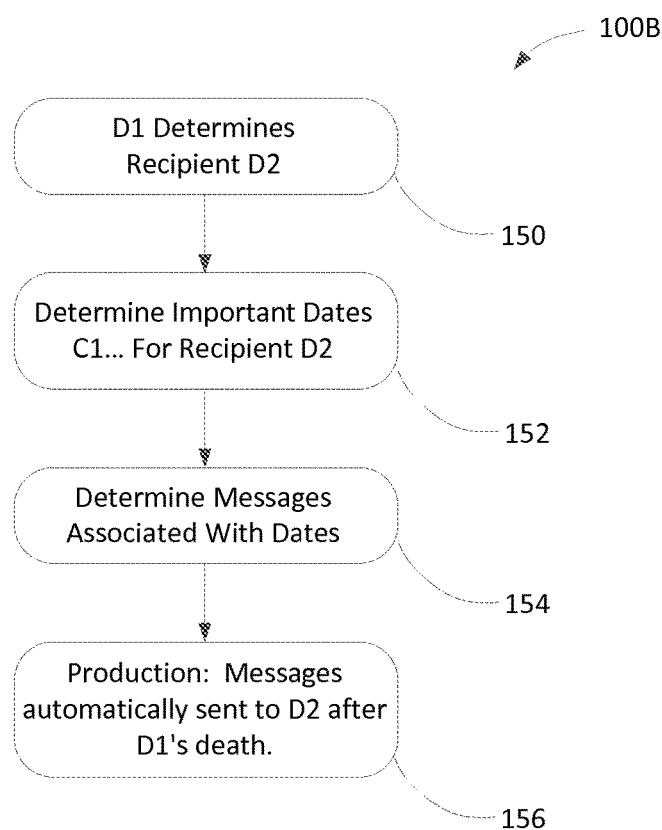
FIG. 1B shows a process of the automated messaging system of FIG. 1A.

FIG. 1B shows a flow diagram 100B illustrative of a process of the legacy server of FIG. 1A. As indicated, a user D1 determines a recipient D2 in block 150. Dates (e.g. C1, C2, C3 . . . ) important to the user and/or to the recipient are determined in block 152. For each recipient-date (e.g. (D2, C1), (D2, C2), (D2, C3) . . . ), a message personal to the user or the recipient is determined in block 154. Following the user's death, the automated messaging system enters a production mode 156 for the deceased user, and on each entered date (C1, C2, C3 . . . ) automatically sends D2 the corresponding message.

Applicant notes that the nomenclature e.g. (D2, C1) provides a convenient way to refer to or to identify messages. In various embodiments, this nomenclature refers to a particular message, to a tag for a particular message, and/or to a pointer to a particular message.

Figure 2A:
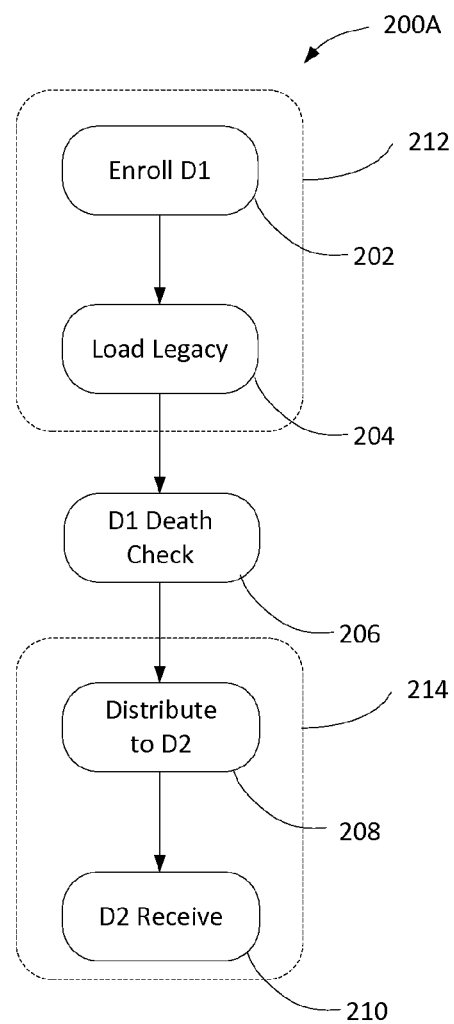
FIGS. 2A-B show flow and timeline diagrams of an embodiment of the automated messaging system of FIG. 1A.
Figure 2B:
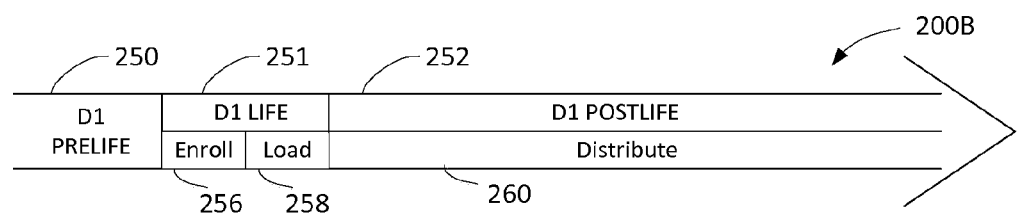

FIGS. 2A-B show flow and timeline diagrams of an embodiment of the present invention 200A-B.

FIG. 2A shows a flow diagram 200A illustrative of a process of the legacy server of FIG. 1A. In step 202 a user D1 enrolls in the automated messaging system and in step 204 legacy information is loaded. A portion of the process including an enrollment step and a loading step is referred to as preproduction 212.

A second portion of the process is referred to as production 214. Production includes a distribution step 208 and a receive step 210. In the distribution step 208, the legacy server 104 sends a message to a recipient D2. In the receive step 210, a recipient D2 receives the message.

Between the preproduction and production process portions 212, 214 is a death check step 206 that occurs before the distribution step 208. If the death check step indicates that user D1 is deceased, the legacy server 104 enters the production process portion 214 and message distribution to a recipient D2 is enabled. After the death of user D1, messages are sent to a particular recipient D2 on the dates (e.g. C1 . . . ) loaded for recipient D2 and message content is the message content associated with e.g. (D2, C1).

The death check step 206 may be satisfied or not as the result of the legacy server 104 evaluating available information. This information may include any of an entry made by a human tasked with the job of updating death status for D1 and records such as electronic public records found during an automated search initiated by the legacy server.

While the above process is described at least in part in connection with a single user D1 and a single recipient D2, multiple users may enroll in the automated messaging system and each user may load or cause to have loaded multiple recipients.

FIG. 2B shows a timeline diagram 200B illustrative of the process of FIG. 2A. As seen, for a particular user D1 the timeline is divided into three segments, D1 prelife 250 (before birth), D1 life 251, and D1 postlife, 252 (after death). During the life segment 251, enrollment 256 and load 258 steps occur. During the postlife segment 252, the distribution step 260 occurs.

Figure 3A:
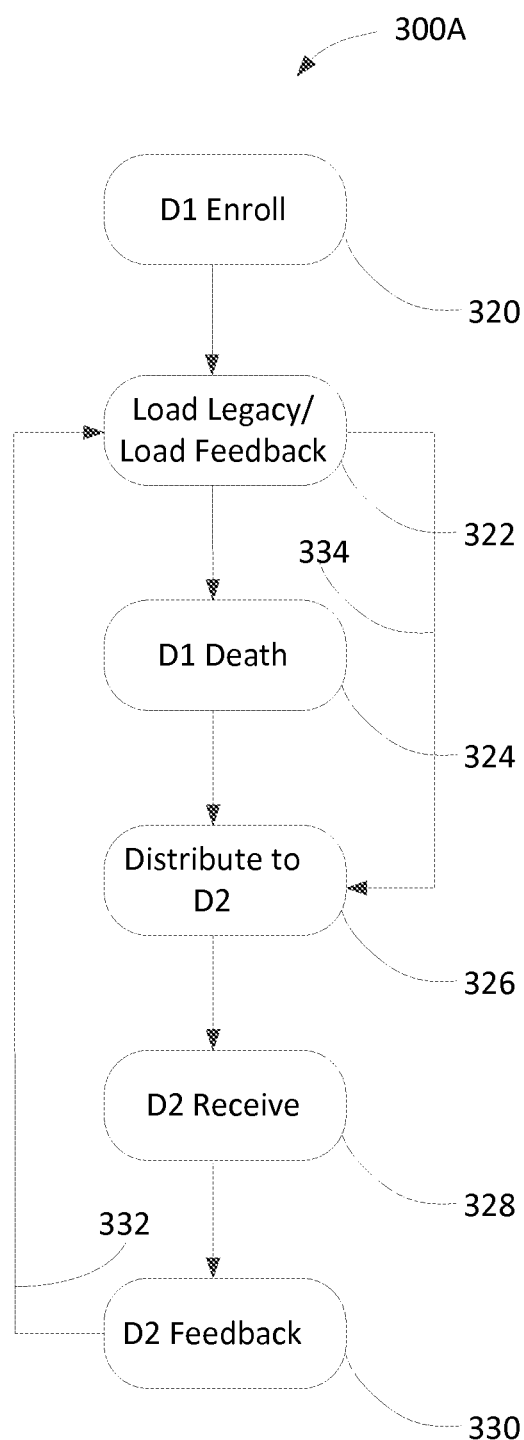
FIGS. 3A-B show flow and block diagrams of an embodiment of the automated messaging system of FIG. 1A.
Figure 3B:
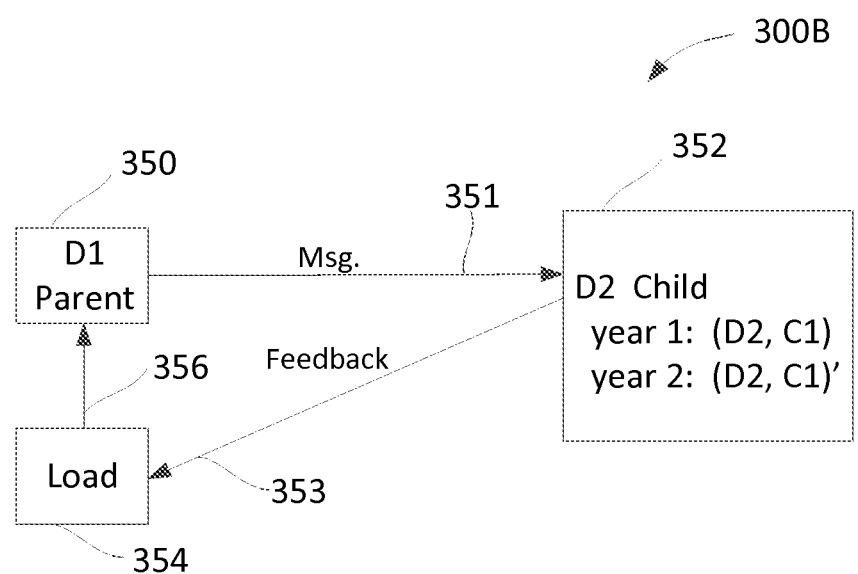

FIGS. 3A-B show a flow and block diagrams of an embodiment of the present invention 300A-B.

FIG. 3A shows a flow diagram 300A illustrative of a process of the legacy server of FIG. 1A. In step 320 a user D1 enrolls in the automated messaging system and in step 322 legacy information is loaded. Step 322 also allows for loading feedback from a recipient as is further described below.

After a user D1 enrolls 320 and at least some legacy information is loaded 322, the legacy server 104 checks for information indicating that the user D1 is deceased in death check step 324. If the death check step indicates that user D1 is deceased, the legacy server 104 subsequently begins distribution 326 of messages to a recipient D2. Messages are sent to a particular recipient D2 on the dates (e.g. C1 . . . ) loaded for recipient D2 and message content is, for example, the message content associated with (D2, C1).

As seen in step 328, D2 receives the message sent by the legacy server 104. Step 330 enables the recipient D2 to provide feedback prompted by D2's receipt of the message. Feedback from D2 returns 332 the process to the Load Legacy/Load Feedback step 322 wherein the legacy server associates the feedback with the sent message (D2, C1) such that subsequent messages (D2, C1)' may include the feedback. To the extent feedback occurs 330, it is loaded 322 as described above and the process returns 334 to the distribute step 326.

FIG. 3B shows a feedback example 300B. In block 350, a parent D1 crafts a recurring message (D2, C1) to remind a child recipient D2 of the parents' anniversary date and to suggest an appropriate gift for a surviving spouse. After the parent's death, the original message (D2, C1) is sent 351. In block 352, the child D2 receives the message and sends feedback 353, such as plans for an upcoming anniversary celebration that will be loaded 354 to amend the message 356.

As seen in the figure, the original message (D2, C1) sent in year 1 is received by D2. After receiving the message in year 1, D2 amends the message via feedback 353 such that in year 2 the amended message D2 receives is (D2, C1)'.

Figure 4A:
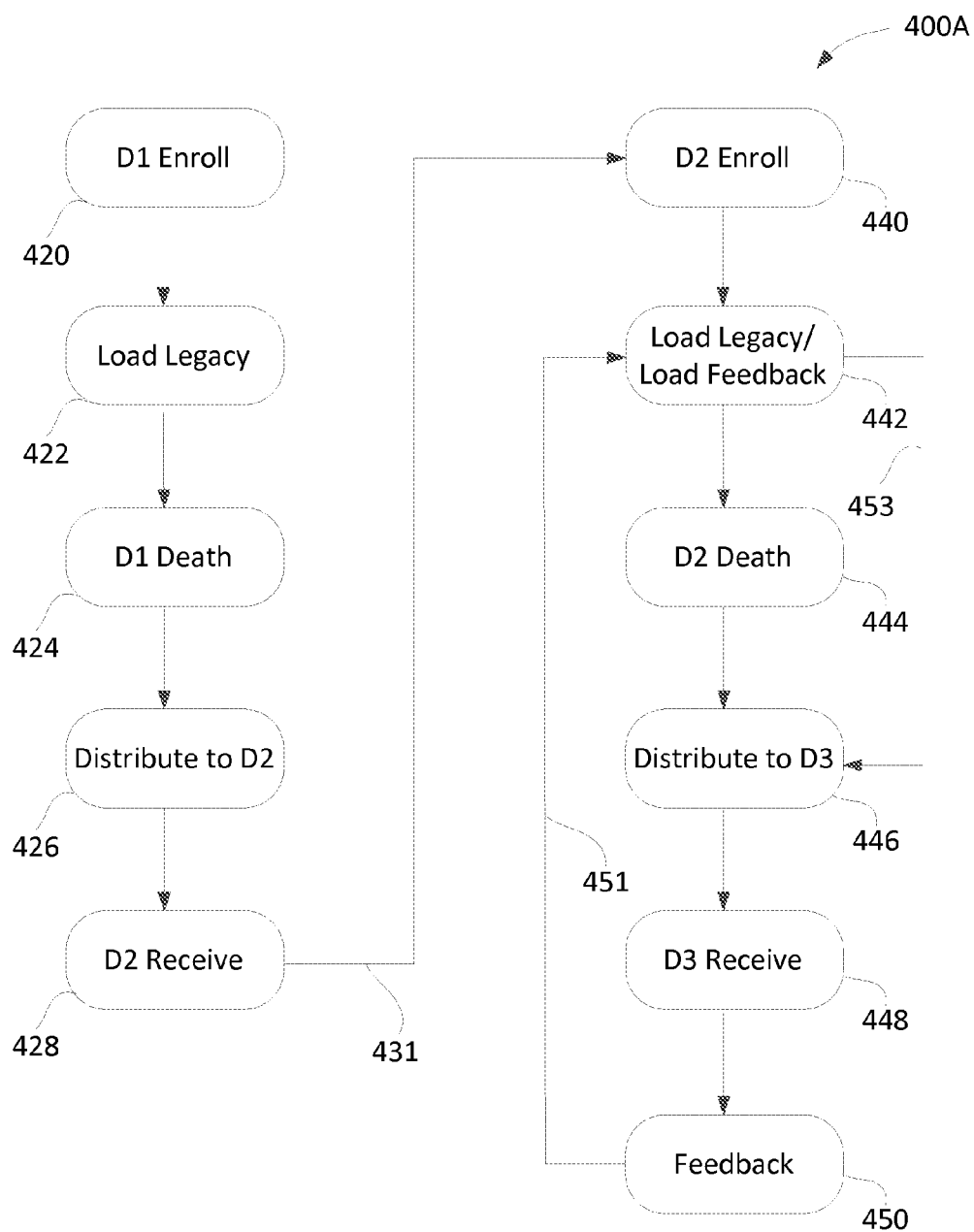
FIGS. 4A-C show diagrams of a multi-generation process of the legacy server of FIG. 1A.
Figure 4B:
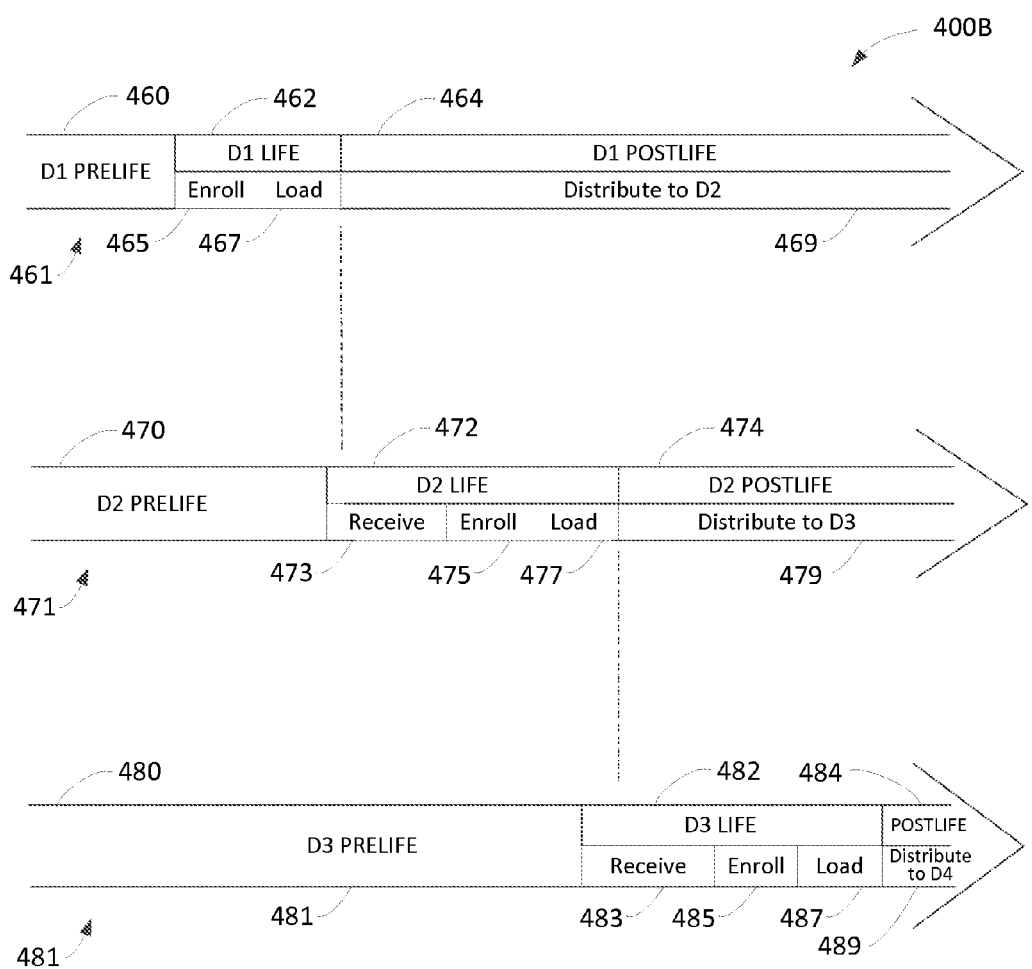
Figure 4C:
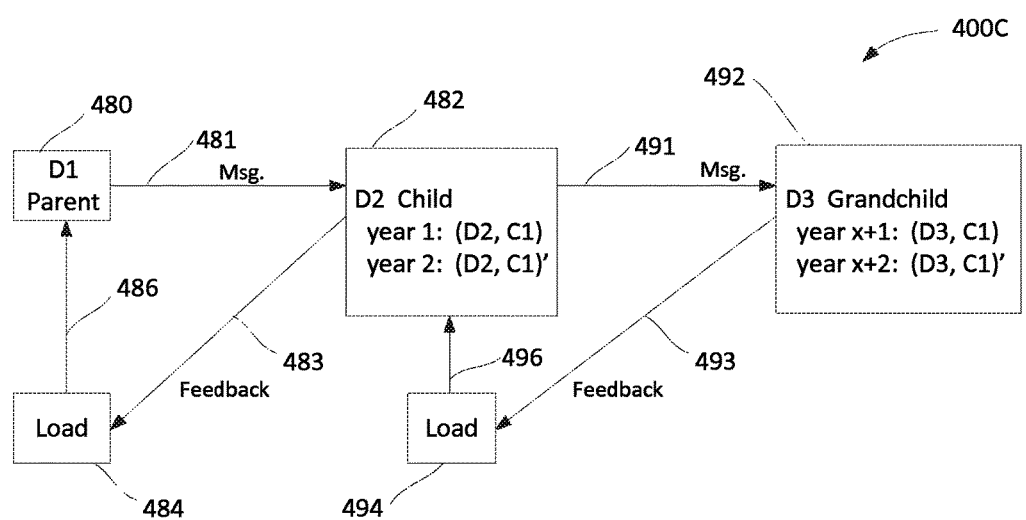

FIGS. 4A-C show diagrams 400A-C of a multi-generation process of the legacy server of FIG. 1A.

FIG. 4A shows a flow diagram 400A illustrative of the multi-generation process. In step 420 a user D1 enrolls in the automated messaging system and in step 422 legacy information is loaded.

After the user D1 enrolls 420 and at least some legacy information is loaded 422, the legacy server 104 checks for information indicating that the user D1 is deceased in a death check step 424. If the death check step indicates that user D1 is deceased, the legacy server 104 subsequently begins distribution 426 of messages to a recipient D2. In step 428, D2 receives a message from D1 sent by the legacy server 104. As described above, messages are sent to a particular recipient D2 on the dates (e.g. C1 . . . ) loaded for recipient D2 and message content is the message content associated with e.g. (D2, C1).

Upon receiving a message from D1, the recipient D2 may be invited to enroll in the automated messaging system as a user. Steps 440 through 453 illustrate this process.

In step 440 user D2 enrolls in the automated messaging system and in step 442 D2 legacy information is loaded. Step 442 also allows for loading feedback from a recipient D3 as is further described below.

The legacy server may invite user D2 to enroll 431 in the automated messaging system. After user D2 enrolls 440 and legacy information is loaded 442, the legacy server 104 checks for information indicating that the user D2 is deceased in death check step 444. If the death check step indicates that user D2 is deceased, the legacy server 104 subsequently begins distribution 446 of messages to a recipient D3. Messages are sent to a particular recipient D3 on the dates (e.g. C1 . . . ) loaded for recipient D3 and message content is the message content associated with e.g. (D3, C1).

As seen in step 448, D3 receives the message sent by the legacy server 104. Step 450 enables the recipient D3 to provide feedback prompted by the receipt of the message. Feedback from D3 returns 451 the process to the Load Legacy/Load Feedback step 442 wherein the legacy server associates the feedback with the sent message (D3, C1) such that subsequent messages (D3, C1)' may include the feedback. To the extent feedback occurs 450, it is loaded 442 as described above and the process returns 453 to the distribute step 446.

FIG. 4B shows a multi-generation timeline diagram 400B illustrative of the process of FIG. 4A. As seen, for each of D1, D2, D3 respective timelines 461, 471, 481 are divided into three segments: D1, D2, D3 prelife 460, 470, 480 (before birth); D1, D2, D3 life 462, 472, 482 (lifetime); and D1, D2, D3 postlife, 464, 474, 484 (after death). During the life segments 462, 472, 482, enrollment 465, 475, 485 and load 467, 477, 487 steps occur. During the postlife segments 464, 474, 484 the distribution steps 469, 479, 489 occur. As seen, during D2's lifetime 472, D2 receives 473 messages from D1. And, as seen, during D3's lifetime 482, D3 receives 483 messages from D2. In some embodiments, D3 may receive messages from D1 with or without some action by D2.

FIG. 4C shows a multi-generation feedback example 400C. In block 480, a parent D1 crafts a message such as a recurring message (D2, C1) to a child recipient D2. After the parent's death, the original message (D2, C1) is sent 481 to the child. In block 482, the child D2 receives the message and sends feedback 483 that will be loaded 484 to amend 486 the message. As seen in the figure, the original message (D2, C1) sent in year 1 is received by D2. After receiving the message in year 1, D2 may (as shown) amend the message via feedback 483 such that in year 2 the message D2 receives is (D2, C1)'.

After receiving a first message, child recipient D2 may enroll in the automated message system as a user for sending messages to a grandchild recipient D3. In block 482, the child user D2 crafts a message such as a recurring message (D3, C1) to a grandchild recipient D3. After the child D2's death, an original message (D3, C1) is sent 491 to the grandchild. In block 492, the grandchild recipient D3 receives the message and may enter feedback 493 that will be loaded 494 to amend 496 the message. As seen in the figure, the original message (D3, C1) sent in year x+1 is received by D3. After receiving the message in year x+1, D3 may (as shown) amend the message via feedback 493 such that in year x+2 the message D3 receives is (D3, C1)'. Notably, this process may repeat for any number of generations.

In the multi-generation process of FIG. 4C, the messages sent may be cumulative. For example, where the $n^{th}$ generation receives (i) messages from n−2 intended for n−1 along with (ii) messages n−1 crafts for the $n^{th}$ generation. In some embodiments, the n−1 generation selects which ones of the messages it received from the n−2 generation that will be forwarded to the $n^{th}$ generation. And in some embodiments messages are crafted as generation skipping messages such as messages n−2 crafts for the $n^{th}$ generation.

Figure 5A:
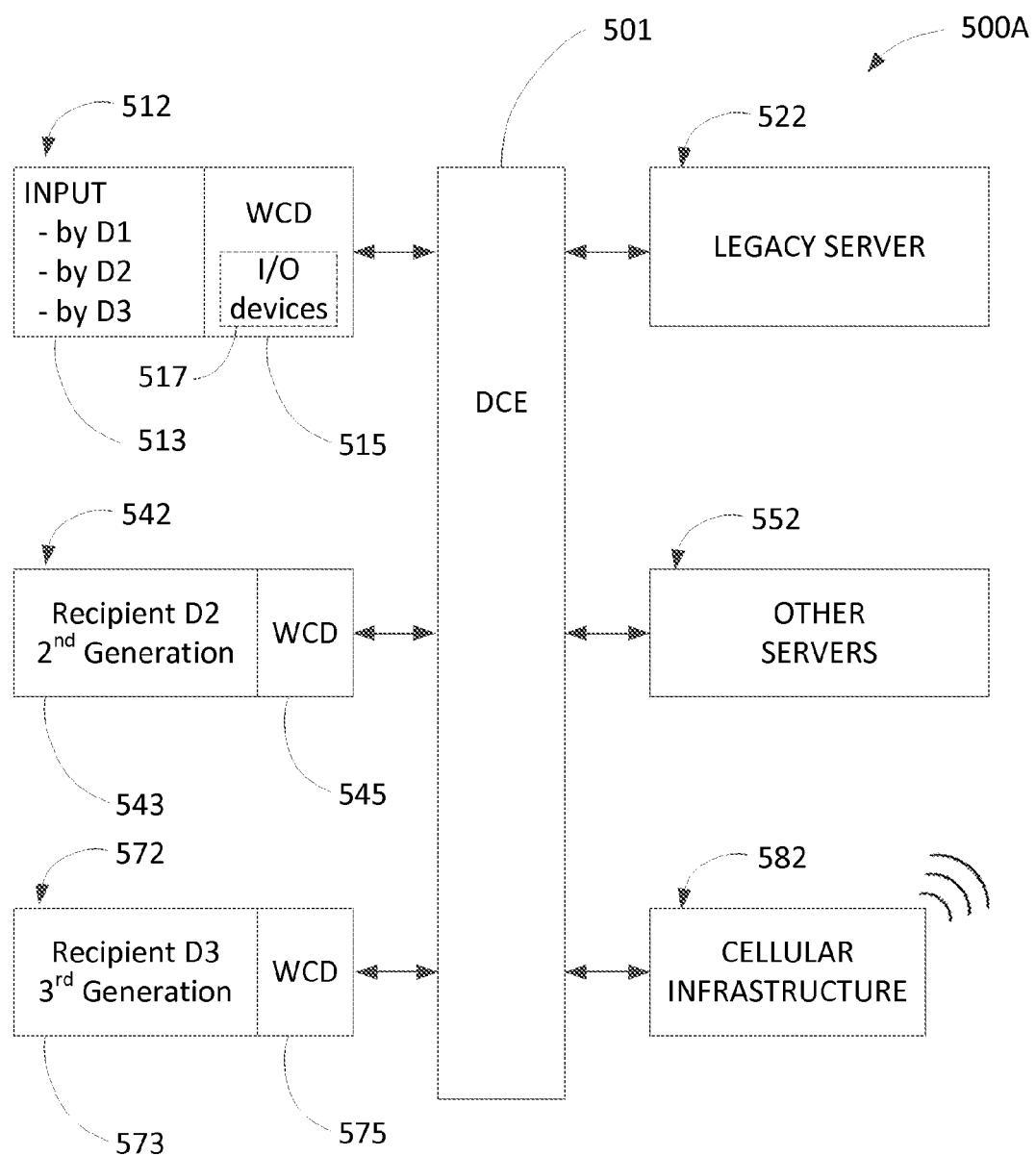
FIGS. 5A-B show block diagrams of hardware and software of the automated messaging system of FIG. 1A.
Figure 5B:
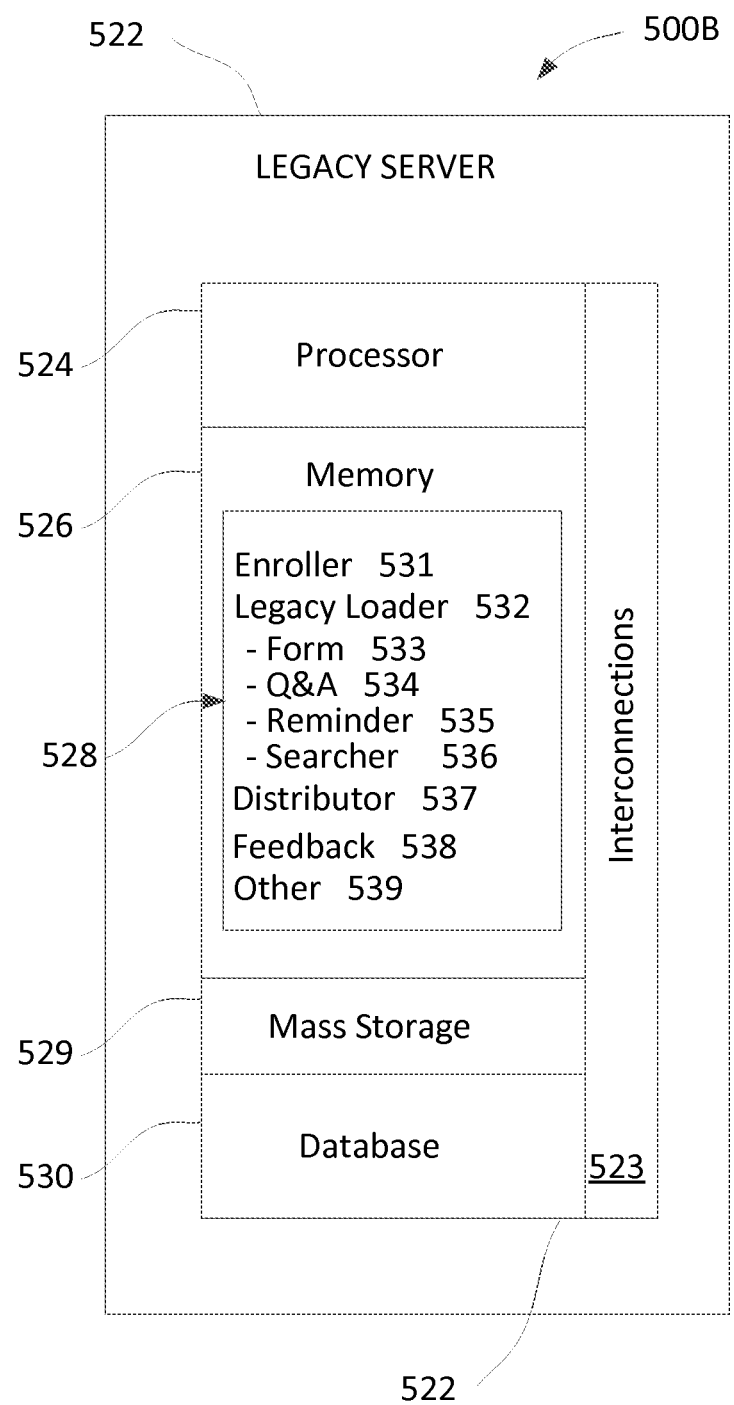

FIGS. 5A-B show block diagrams of hardware and software 500A-B used with various embodiments of the automated messaging system of FIG. 1A.

FIG. 5A shows a block diagram 500A with a data communications exchange block ("DCE") 501 such as one or more of a network, a cloud infrastructure, or the Internet. The DCE interconnects a legacy server 522 with one or more of (i) one or more web or network connected devices ("WCD") for users and recipients 512, 542, 572, (ii) other servers and/or services 552, and (iii) a cellular communications capability 582 such as via a cellular telephone infrastructure.

Among other things, the legacy server 522 receives and stores legacy information associated with users and recipients. As shown in a user block 512, the legacy server may receive user input 513 from one or more users D1, D2, D3 via the DCE and a web connected device WCD 515 such as a computer, cellphone, tablet, or the like. The WCD includes input/output device(s) 517 such as one or more of a keyboard, mouse, monitor, touch screen monitor, tablet, microphone and/or voice recorder, camera and/or picture/image recorder, and camera and/or video recorder. In some embodiment an imaging device includes a digital video camera for imaging a user and/or documents or scenes a user wishes to include in a message directed to a recipient. And in some embodiments, a digital video camera provides for user voice and image recording.

As used herein, legacy server refers to a computing device(s) which uses local or remote storage such as a cloud storage facility. And, as used herein, legacy information includes information about a user, information about a recipient associated with the user, and messages the user intends to send to the recipient. In some embodiments, D1, D2, and D3 are successive generations ($1^{st}$, $2^{nd}$, $3^{rd}$) of users such as (parent, child, grandchild).

A first recipient block 542 may provide for recipient D2's receipt 543 of D1's messages. These messages are sent by the legacy server 522 to recipient D2 via the DCE 501 and a WCD 545 available to recipient D2. In similar fashion, a second recipient block 572 may provide for recipient D3's receipt 573 of D2's messages via a WCD 575 available to recipient D3. In some embodiments, recipient D3 may receive messages from user D1, for example as explained above.

FIG. 5B shows a block diagram 500B of the legacy server 522. The legacy server includes a processor 524, a memory 526 such as random access memory and/or a mass storage device 529. In some embodiments, a database 530 such as a database residing on a static or moving media mass storage device is provided. Data communications among the processor, memory, and mass storage device are provided by one or more interconnections or communications paths 523. Exemplary interconnections include intra computer communications paths including data busses and data channels and inter computer communications paths including network, cloud, Internet, and cellular interconnections.

Legacy server 522 functionality is typically provided by applications such as software applications that are moved to and/or run from a space 528 in memory 526 when needed. As shown, these applications may include an enroller 531, a loader 532, a distributor 537, a feedback loader 538, and other applications 539. Legacy loader applications may include one or more of a form application 533, a question and answer application 534, a reminder application 535, and a searcher application 536.

A new user is added to the automated messaging system 500A when the new user enrolls in the automated messaging system. Enrollment includes the user's provision of personal information which is stored (e.g. in database 530) by the legacy server 522. Enrollment typically occurs during a user session with the legacy server enrollment application. This session may include verification of the user's identity, issuance of credentials such as a user name and password, and payment for use of the automated messaging system. Notably, a user may enroll, at least partially, other person(s) such as a member of a prior or subsequent generation in the user's family.

FIG. 5C shows an enrollment chart 500C. Basic information for enrolling a user includes full legal name, physical address where U.S. Postal Service mail is received, email address, cell telephone number, and birth date (optionally city and state of birth). The above information reduces the likelihood that a mistake in identification of the user will arise, for example when an on-line service such as a vital statistics service is searched for information about the user. Optional information includes the user's social security number, driver license state and number, passport country and number. To the extent the user is pre-enrolling another person, basic information for pre-enrollment includes the pre-enrollee's name, email address, and cell phone number.

The loader 532 solicits or obtains legacy information and may include one or more applications.

FIG. 5D shows exemplary loader applications 500D for soliciting legacy information. These loader applications solicit legacy information using (i) fill in the blank form(s), (ii) an interview where the legacy server presents questions that the user answers, (iii) a reminder where the legacy server sends the user a request for information such as missing information or event information (see e.g. legacy information charts discussed below) using e.g. email or a text message, and (iv) a searcher where the legacy server searches sources such as on-line sources to find unknown information or to verify information. In some embodiments, functions of the loader may be used to solicit enrollee information, for example information about a pre-enrollee that was not entered by the user making the pre-enrollment.

FIG. 5E shows a recipient identification chart 500E. Recipient information is used to identify a person the user wishes to send messages to (i.e., a message recipient). Basic recipient information includes full legal name and/or a short/nick name along with an email address and/or a cell telephone number.

FIG. 5F shows a dates and messages chart 500F for associating a recipient with particular dates and for associating each recipient-date with a message. Tabular headings include occasion, date of the occasion, message associated with the occasion, and an indication as to whether the message is recurring or not. Any of the blank spaces in this form may be used to indicate the presence/absence of information and/or the location of information previously entered. For example, the user may access a MESSAGE entry and be redirected to a message architect application such that after message creation, the MESSAGE entry indicates a message has been entered and provides a means such as a link for editing the message.

Occasions shown in the chart include: i) occasions personal to recipient; occasions personal to user; and occasions that are not personal to the user or the recipient.

Occasions personal to a recipient include birth date, marriage anniversary, special occasions (e.g., sweet 16, graduation, confirmation and the like), special memories (e.g., remember the day that we . . . ), child born to recipient after user's death, marriage of recipient after user's death, and other.

Occasions personal to the user include birth date, marriage anniversary, special occasions, date of death, x days after death, y weeks after death, z months after death, and other.

Occasions that are not personal to the recipient or the user include holidays, lessons, secrets, and other. Lessons may provide an occasion for a user to share, for example, a lesson learned with a child. Secrets may provide an occasion for a user to share a secret, for example a parent might share a secret with a child, such as a date of adoption or and identity of an unknown sibling.

Messages may include any prerecorded content available to a user's WDC 515 or any content entered via a WCD input device such as a keyboard, mouse, touch screen, audio recorder, video recorder, USB port or the like. For example, a user might assemble a message in the form of a letter or note with a linked audio portion and a linked photograph. In various embodiments, content available from the Internet is selected by the user and embodied in the message, for example the linked photograph and/or audio may have been obtained from online service such as Flickr, Facebook, Sony Playmemories Online, Google, Dropbox, and Google Picasa.

In some embodiments, a recurring message is automatically updated. For example, message content might include a Facebook photograph of the user and recipient (e.g., parent and child) at a Bears-Packers football game such that in the year the message is sent, the score from the last such game is presented along with a comment appropriate in the context of the score. See e.g. www.jhowell.net for services providing historical football game scores.

FIG. 5G shows a message architect 500G with information format versus source. Users may create messages for recipients for delivery on particular dates. As discussed above, message content may be crafted to include one or more information formats including text, audio, photographs, and video. In each case, a user may provide this content as by using one or more input/output devices 517 of the WCD 515. This content may also be provided when the WCD 515 or the legacy server 522 accesses online services 552 as sources for the content. Text online sources include text available from Google, Facebook, Twitter, www.newspapers.com, and the like. Audio online sources include audio available from music sites such as Google Play, www.newspapers.com, and the like. Photograph and video online sources include photographs and videos available from Google, Facebook, www.newspapers.com, Google Picasa, Flickr, and the like.

The legacy server 522 may search for information needed to complete the user enrollment chart 500C, the recipient identification chart 500E, and the dates and messages chart 500F.

FIG. 5H shows various Internet sources and services available to provide particular types of information 500H. Legacy server 522 functionality includes searching these sources and services as needed to complete the charts 500C, 500E-F.

Exemplary searches include the following. Where an email address is needed, Yahoo email address search, spokeo.com, linkedin.com, social media sites, and google.com may be automatically searched. Where a cell phone number is needed, nationalcellulardirectory.com, spokeo.com, social media sites, and google.com may be searched. Where a birth date is needed, anybirthday.com, social media sites, and google.com may be searched. Where a marriage date is needed, publicrecordscheck.com, vital-records.archives.com, social media sites, and google.com may be searched. Where a verification that a sent email was opened is needed, readverity.com may be searched or an enable delivery receipt action may be taken. Where a verification that a sent text message was opened is needed, an enable delivery receipt action may be taken. Where a date of death notice as for a death check is needed, publicrecordscheck.com and vital-records.archives.com may be searched.

Figure 5I:
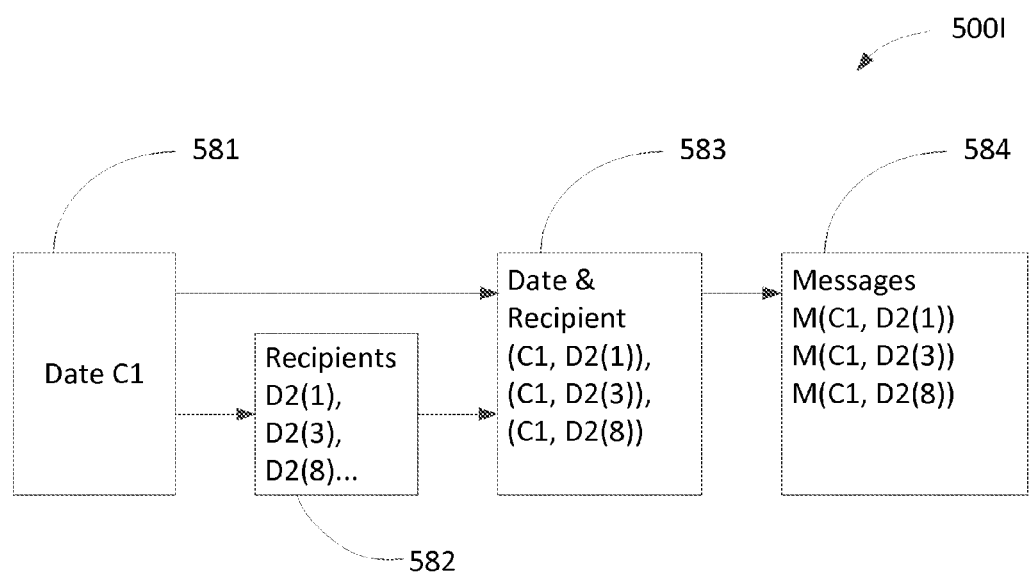
FIG. 5I shows a message distributor for use with the automated messaging system of FIG. 1A.

FIG. 5I shows a distributor block diagram 500I. After the death of a user D1, the legacy server 522 enters a production mode 214 and uses legacy information associated with D1 (see e.g., charts 500C, 500E, 500F) to send messages to one or more designated recipients D2(1), D2(3), D2(8).

In an embodiment, the legacy server 522 (i) selects a particular date C1 in a date selection block 581, (ii) determines recipients D2(1), D2(3), D2(8) intended to receive messages from D1 on the selected date in a recipient determination block 582, (iii) forms message locators (C1, D2(1)), (C1, D2(3)), (C1, D2(8)) in a message locator block 583, and (iv) sends the located messages M(C1, D2(1)), M(C1, D2(3)), M(C1, D2(8)) to the recipients D2(1), D2(3), D2(8). In some embodiments, the legacy server determines recipients and sends messages such that each message reaches a corresponding recipient on date C1 irrespective of the time zone in which the recipient is located.

While various embodiments of the present invention have been described above, it should be understood that they have been presented by way of example only, and not limitation.

It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The invention claimed is:

1. An automated messaging system (AMS) comprising:
   a data communications exchange facility interconnecting a user device, recipient devices, and a legacy server;
   the legacy server including a processor interconnected with a main semiconductor memory;
   a database in a mass storage device, the database for saving legacy information;
   a legacy server loader for enrolling the user in the AMS and for soliciting legacy information from the user;
   the legacy information includes a plurality of personalized messages directed to a plurality of recipients, each message associated with a particular recipient and each message associated with a particular delivery date;
   a death check periodically performed by the legacy server to determine if the user is deceased; and,
   a legacy server production mode entered when the death check indicates the user is deceased;
   wherein production mode is a precursor to message delivery and during production mode the legacy server distributes the user's messages to the devices of the intended recipients on the dates specified by the user.

2. The AMS of claim 1 further comprising:
   a recurring message saved in the database;
   a legacy server feedback loader for amending the saved recurring message after the message is delivered to a recipient;
   the amendment to the recurring message made when the legacy server invites the recipient to offer feedback and the feedback loader causes the saved message to be amended in accordance with the feedback; and,
   when the message is next delivered to the recipient the delivered message is the amended message.

3. The AMS of claim 2 further comprising a multi-generation enrollment facility wherein a first recipient associated with a first user is enrolled as a second user when the first recipient responds to a legacy server invitation to enroll, the legacy server loader solicits legacy information from the second user that identifies a second recipient, the legacy server sends messages from the first user to the second recipient when a death check indicates the first user is deceased, and the legacy server sends messages from the second user to the second recipient when a death check indicates the second user is deceased.

4. The AMS of claim 3 further comprising a legacy server reminder facility whereby the legacy server sends requests for legacy information to a user in response to a legacy server finding that the user has not completed the entry of legacy information for a particular recipient.

5. The AMS of claim 4 wherein the legacy server reminder facility sends requests for legacy information to a user on date x in response to a legacy server finding that a message saved by the user is associated with a date that is within one week of date x.

6. The AMS of claim 5 further comprising a legacy server search facility whereby the legacy server queries a public records Internet service when it performs a death check.

7. An automated messaging system (AMS) method for creating, archiving, and distributing messages of a user to recipients identified by the user after the user's death, the method comprising the steps of:
   providing a data communications exchange facility interconnecting a user device, recipient devices, and a legacy server;
   including in the legacy server a processor interconnected with a main semiconductor memory;
   providing a mass storage device, the mass storage device including a database for saving legacy information;
   the legacy server enrolling a user in the AMS and soliciting legacy information from the user, the legacy information including a plurality of personalized messages directed to a plurality of recipients, each message associated with a particular recipient and each message associated with a particular delivery date;
   the legacy server periodically performing a death check via querying a public records Internet service to determine if the user is deceased; and,
   the legacy server entering a production mode for the user when the death check indicates the user is deceased;
   wherein production mode is a precursor to message delivery and during production mode the legacy server distributes the user's messages to the devices of the intended recipients on the dates specified by the user.

* * * * *